Sept. 8, 1964 R. M. SCHAFFERT 3,148,354

PHOTOELECTRIC RECORDING APPARATUS

Filed Dec. 20, 1961 4 Sheets-Sheet 1

INVENTOR
ROLAND M. SCHAFFERT

BY John S. Gasper

ATTORNEY

Sept. 8, 1964 R. M. SCHAFFERT 3,148,354

PHOTOELECTRIC RECORDING APPARATUS

Filed Dec. 20, 1961 4 Sheets-Sheet 3

United States Patent Office 3,148,354

Patented Sept. 8, 1964

3,148,354

PHOTOELECTRIC RECORDING APPARATUS

Roland M. Schaffert, Saratoga, Calif., assignor to International Business Machines Corporation, New York, N.Y., a corporation of New York Filed Dec. 20, 1961, Ser. No. 160,784

9 Claims. (Cl. 340—173)

This invention relates to an improved apparatus for storing and retrieving information and particularly to a device in which information is stored and retrieved through the combined operation of electrical and photo phenomena.

Previous devices for storing information utilizing electrical and photo phenomena possess certain inherent disadvantages which limit their application. Among these disadvantages were relatively short storage life, loss of signal strength over extended periods of storage. In addition, special storage conditions and/or equipment were required.

It is the principal objective of this invention to provide an information storage device and for using the same which overcomes the above disadvantages.

It is an additional object of this invention to provide an improved storage device in which information may be stored indefinitely, without loss of signal strength.

It is a further object of the present invention to provide an information storage device which is low in cost per unit of storage, simple in construction, and which does not require complex auxiliary apparatus.

It is a still further object of this invention to provide an information storage device which may be utilized for processing both qualitative and quantitative information.

It is an object to provide a memory device analogous to a magnetic memory but which permits optical read-in and read-out.

These and other objects are accomplished in accordance with this invention by utilizing the combination of ferroelectric and photoconductive phenomena for information storage and retrieval. Specifically, this is accomplished with a memory element having superimposed layers of photoconductive and ferroelectric materials interposed between a pair of conductive electrodes much in the style of a sandwich. The electrode in contact with the surface of the photoconductive layer is transparent to photoenergy. In the memory element, the photoconductive layer is sensitive to light while the ferroelectric layer is sensitive to changes in electric field. In accordance with the practice of this invention, the input or write-in will be accomplished optically by exposing the photoconductive layer to photo pulses which, together with an applied voltage, will produce switching of the domains of the ferroelectric layer in the selected areas exposed to the photo pulses. Read-out of the stored information is obtained optically by exposing the photoconductive layer to a scanning photo beam, while a reverse applied voltage will produce a re-switching of the previously switched domains of the ferroelectric layer.

The foregoing and other objects, features and advantages of the invention will be apparent from the following more particular description of preferred embodiments of the invention, as illustrated in the accompanying drawings.

FIGS. 3*a–e* are schematic views illustrating the sequence of steps of the method of the present invention and showing the effects of the various operational steps on a memory element illustrated in cross section.

Figure 4:
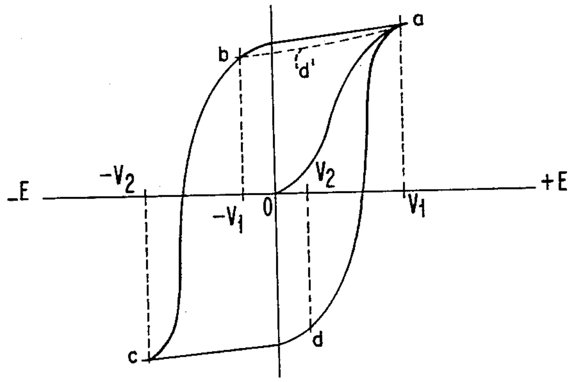

FIG. 4 shows a hysteresis loop illustrating the physical principles obtained in accordance with the practice of the present invention.

Figure 5:
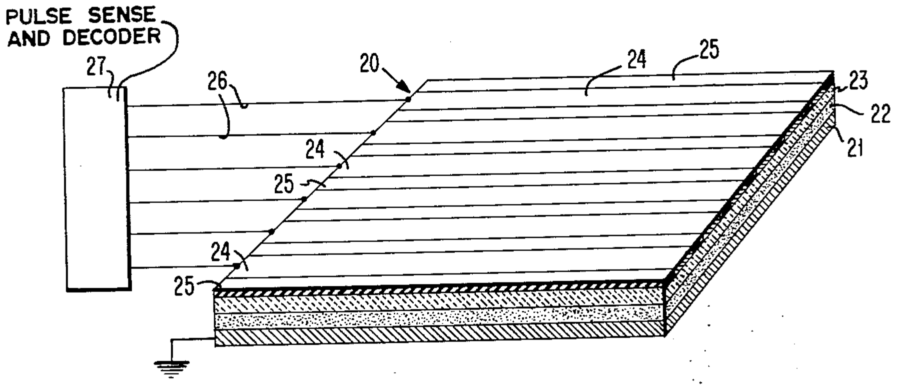

FIG. 5 is a perspective view of a multiple-track memory element utilized in practicing a method of the present invention in accordance with a specific embodiment thereof.

Figure 1:
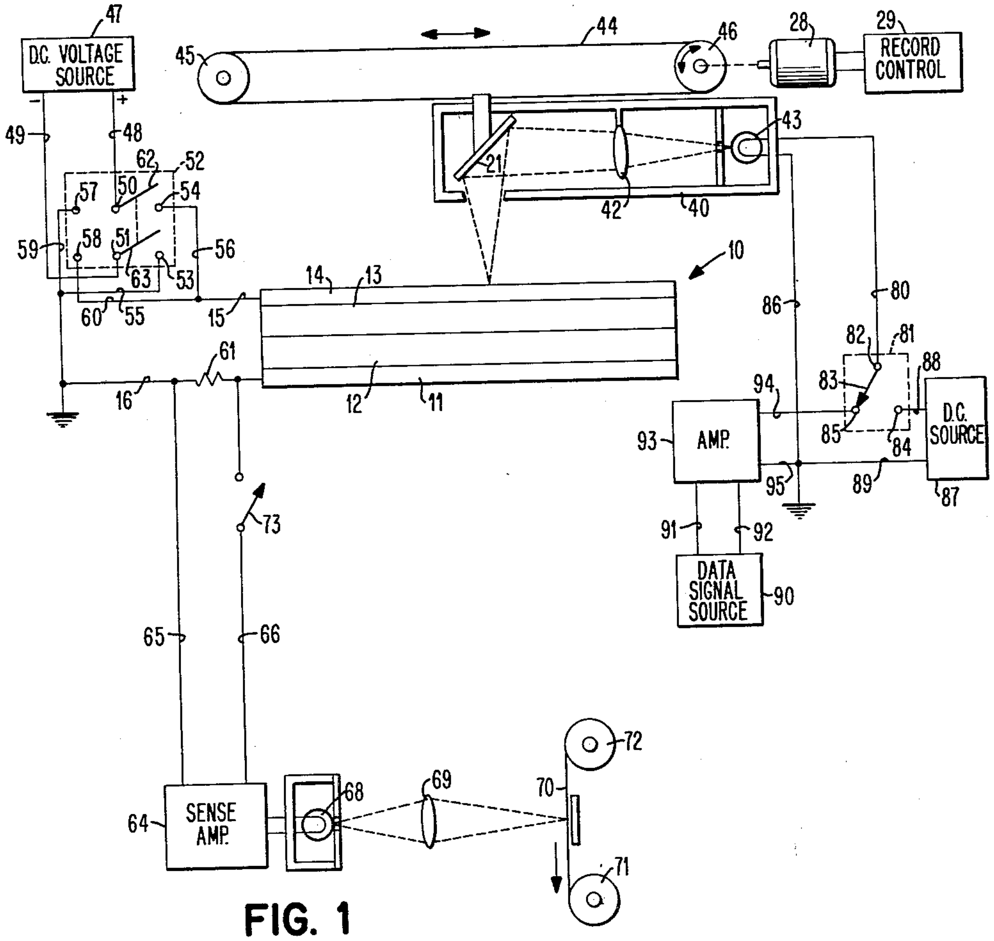
FIG. 1 is a schematic of a recorder apparatus incorporating the principles of the present invention.
Figure 6:
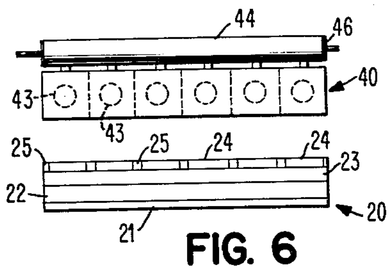

FIG. 6 shows a side view schematic of FIG. 1 in which parallel recording may be practiced with a storage element of FIG. 5.

Figures 7, 8:
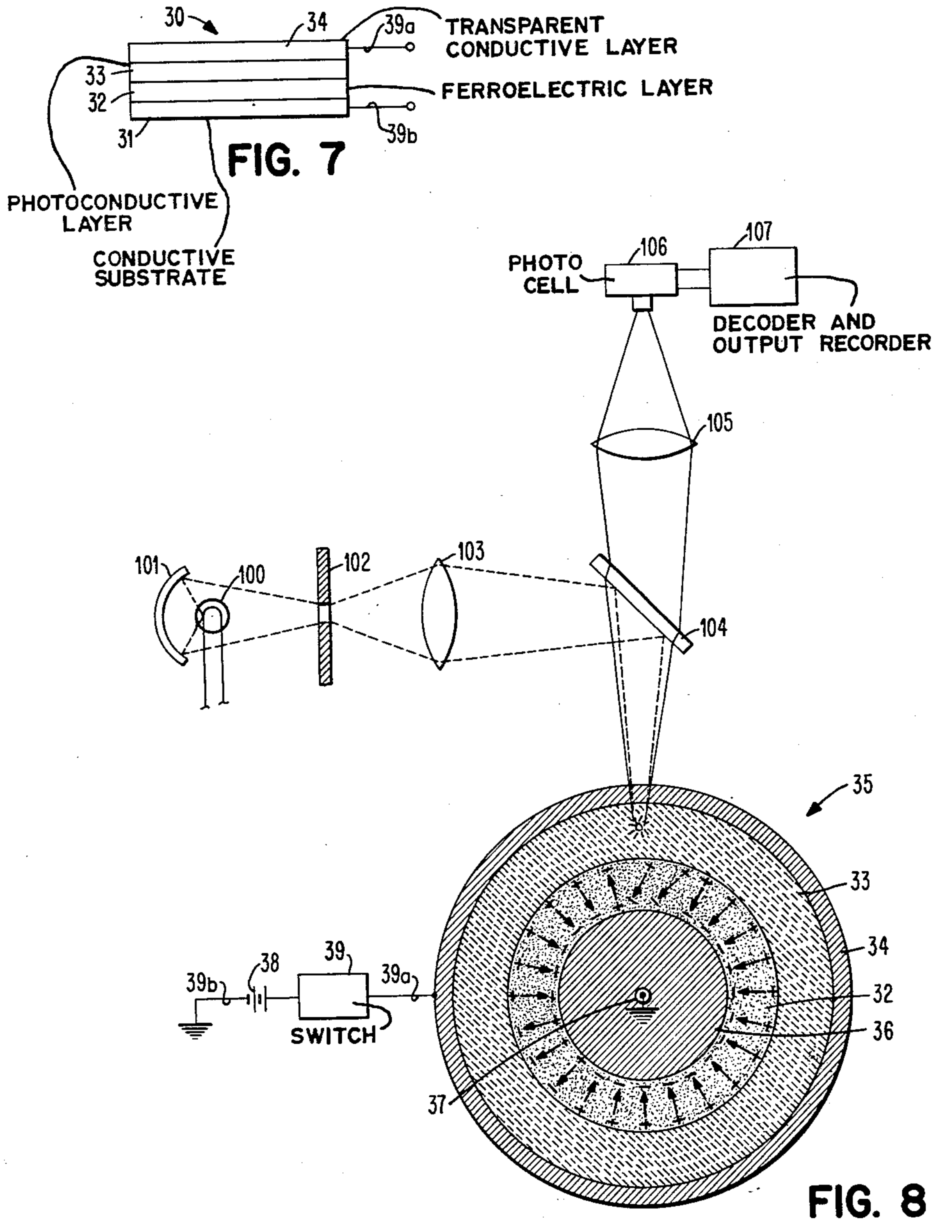

FIG. 7 shows a second embodiment of a storage element adapted for parallel recording.

FIG. 8 is a schematic of a recorder apparatus having a storage element of the type shown in FIG. 7 but which has a continuous recording surface in the form of a cylindrical drum.

Figure 2:
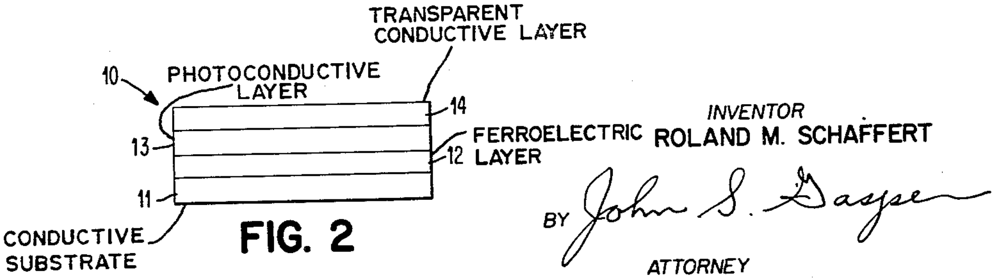
FIG. 2 is a cross-sectional view of a memory element adapted for practicing the present invention.

Referring to the drawings, FIG. 2 shows (in cross section), a storage element consisting of laminar layers forming a memory or storage sandwich. As shown in FIG. 2, the storage element is a plate member 10 having a conductive substrate 11 on which is superimposed a ferroelectric layer 12. A photoconductive layer 13, superimposed on the ferroelectric layer 12, has a transparent conductive layer 14 superimposed on it. In the embodiment of FIG. 2, the various layers are continuous and each layer is in continuous physical and electrical contact with every portion of the surface of the adjacent layers.

While the storage element in FIG. 2 is a plate member 10, the storage element may take the form of a drum. In such case, the conductive substrate 11 takes the form of a conductive cylinder having a peripheral outer surface onto which the ferroelectric and other layers 12, 13, and 14 are superimposed. Such a drum, of course, could be part of a rotor assembly which could be rotatably mounted in a manner similar to the well-known magnetic record drums.

The manufacture of the plate member 10 may be conducted in accordance with well-known techniques. One form of plate member 10 would consist of a copper substrate 11, a ferroelectric layer 12 of barium titanate, a photoconductive layer 13 of selenium. The photoconductive and ferroelectric layers can be quite thin, i.e., in the range of 1–10 microns. The transparent conductive layer 14 can be an extremely thin evaporated metal such as aluminum or silver or a conductive oxide.

Suitable other photoconductors might be anthracene, CdS, CdSe, ZnS, ZnSe, and others. Suitable ferroelectrics in addition to barium titanate might be a mixture of barium titanate and lead titanates or stannates, or potassium dihydrogen phosphate.

The method whereby the plate member 10 of FIG. 2 (and its cylindrical counterpart) may be used for storing information may be understood by references to FIGS. 3*a–e*. In general the method of recording utilizes the fact that the photoconductive layer 13 is sensitive to light and the ferroelectric layer 12 is sensitive to changes in electric field. Input or read-in is accomplished by exposing the photoconductive layer 13 to light pulses which together with an applied voltage will produce polarization of the ferroelectric layer 12 in the selected areas exposed to the light pulses. In order to perform a recording function, however, the ferroelectric layer 12 must be normalized, i.e., all domains are polarized in one direction. In the event the layer 12 of plate member 10 is in unpolarized condition initially, a voltage, e.g. +V (FIG. 3*a*), having a first polarity is applied to leads 15 and 16 which are connected to conductive layers 14 and 11 respectively.

Figure 3A:
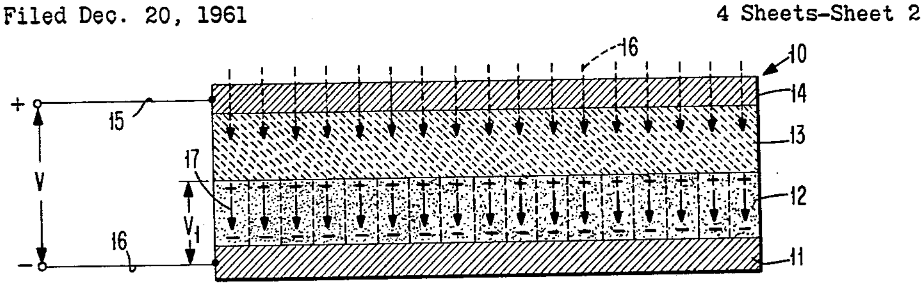

If at the time the voltage V is applied, the plate member 10 is in darkness, only a small portion of the voltage V exists across the ferroelectric layer 12 because of the high resistance of the photoconductive layer 13. In such condition the voltage applied across layer 12 is insufficient to polarize or switch domains therein. Coincidentally with the application of the voltage V, photoenergy is applied over the entire surface of photoconductive layer 13 through transparent conductive layer 14. Thus the resistance of the photoconductive layer 13 is reduced substantially and a greater portion of the applied voltage is then across the ferroelectric layer 12. If the applied voltage is of sufficient magnitude, all the domains of the ferroelectric layer 12 are polarized in one direction. As shown in FIGS. 3*a–e*, the broken line arrows 16 signify photo radiation and the continuous line arrows 17 symbolize the polar orientation of the domains in the ferroelectric layer 12. As seen in FIG 3*a*, all the arrows 17 are pointing in the same direction indicating that all domains have uniform polarization or switching, i.e., layer 12 has been normalized.

While the preceding step is applicable in a situation where the plate member 10 has a ferroelectric layer which has not previously been polarized, the same step would be taken where the layer 12 has various domains in different polarities. Before recording can begin in either case in the plate member 10 of FIG. 1, the normalizing step must be taken.

Figure 3B:
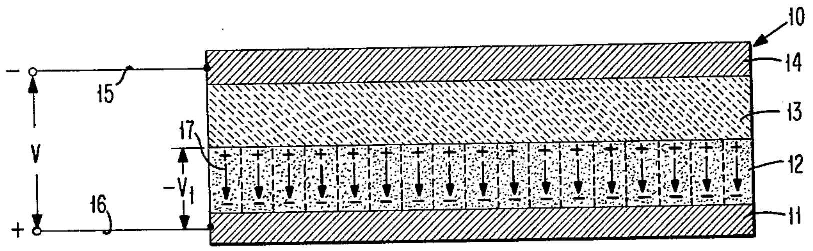
Figure 3C:
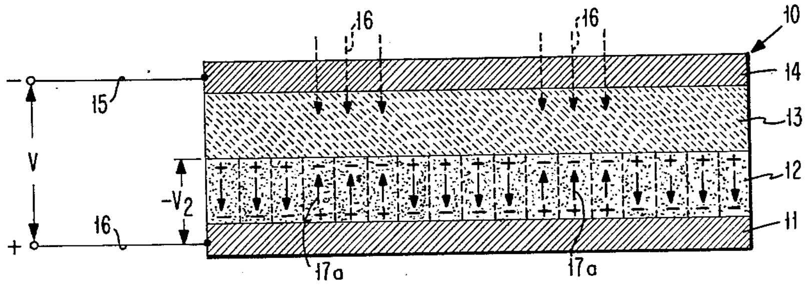

With all domains switched to the same polarity, i.e., normalized, the recording process then continues with placing the plate member 10 in darkness and coincidentally reversing polarity of potential on leads 15 and 16 from +V to −V as illustrated in FIG. 3*b*. With the reverse polarity potential thus applied, recording is accomplished by projecting spots or slits of light, as shown by broken arrows 16 in FIG. 3*c*, through layer 14 onto surface of layer 13. The projection of spots or slits of light onto the photoconductive layer 13 may be accomplished serially, for example, when a single source of pulsating light and the plate member 10 are moved relative to each other and the pulsing of the light occurs in timed relation with such movement. In the areas of the light spots, the voltage across the ferroelectric layer 12 will be increased sufficiently to polarize the layer in the opposite direction to normal as indicated by the arrows 17*a* in FIGS. 3*c* and 3*d*.

After the recording step, the ferroelectric layer 12 will remain in the condition of selective polarization in the areas where the light pulses occurred. This condition will persist even when the applied voltage is removed. With the voltage removed, the plate member 10 can be brought into light and stored. The selective polarization will continue to exist even with application of reverse polarity voltage so long as the photoconductive layer receives no photoenergy.

Figure 3D:
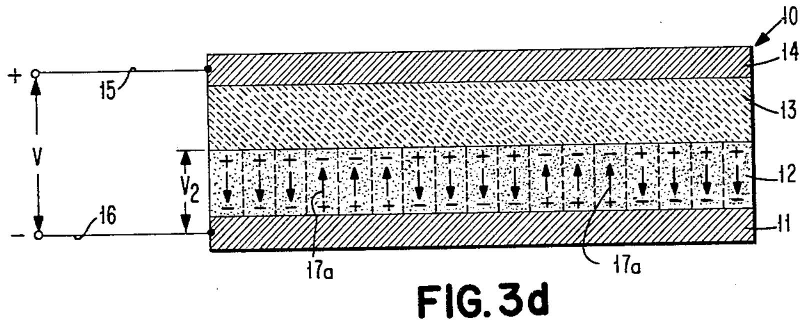

When the domains of ferroelectric layer 13 are switched from one polarity to another, a current pulse can be detected in the circuit which includes leads 15 and 16. This phenomenon provides the basis on which read-out is performed. In order to read-out, however, the domains which have been switched on read-in or record must be reswitched. To accomplish this, the potential on leads 15 and 16 is changed to the polarity as for normalizing while plate member 10 is maintained in darkness (FIG. 3*d*). The surface of plate member 10 is then scanned by a continuous traveling beam of light, indicated by broken arrows 16 in FIG. 3*e*. As the beam scans the surface, successive regions of photoconductive layer 13 are exposed to photoenergy. Thus each successive area of layer 13 has its resistance reduced. In those domains not switched on read-in due to the polarity of the applied voltage, no switching of domains will occur. In those areas having domains switched on read-in as shown by arrows 17*b* in FIG. 3*e*, the domains will be switched back to "normal." Each time a domain is switched a current pulse appears at the circuit of leads 15 or 16, thereby giving a signal corresponding to the information put into storage. Since the readout (as well as read-in) is performed serially, a data code, based on time spacing and counting of number of bits, may be utilized to represent various characters and symbols.

The behavior of the ferroelectric layer 12 during the cycle of recording storage and read-out can be understood by reference to FIG. 4. It will be seen that FIG. 4 shows a hysteresis loop which describes the state of polarization of the ferroelectric layer 12 as a function of the electric field imposed upon it.

Figure 3E:
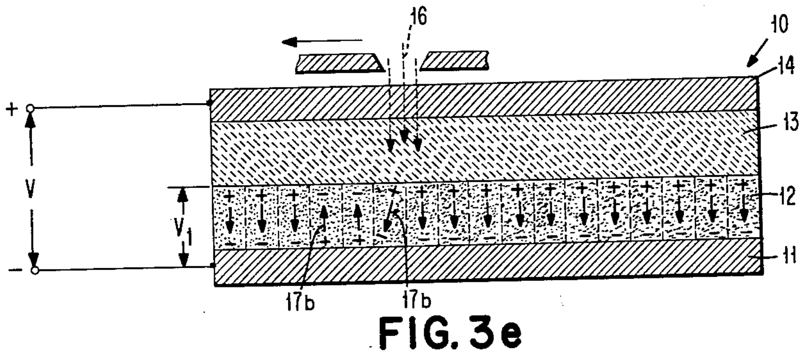

During the normalizing step as described in FIG. 3*a*, the polarization of layer 12 follows the path from 0 to "*a*" due to the imposition of the increased voltage $V_1$. When the photoenergy is removed and the applied voltage is reversed as shown in FIG. 3*b*, a smaller negative voltage $-V_1$ exists across layer 12. The polarization then traces the solid line curve of the hysteresis loop from "*a*" to "*b*." Under the conditions illustrated by FIG. 3*c*, those domains of layer 12 in contact with areas of layer 13 exposed to light 16 experience a further increase in negative voltage $-V_2$. In those areas not radiated, layer 12 experiences voltage $-V_1$. In the area exposed to light pulses, the polarization in those areas then travels the path of hysteresis loop from "*b*" to "*c*." Reversal of the applied voltage with the plate member 10 in darkness as shown in FIG. 3*d* produces a small positive voltage $V_2$ across layer 12. Polarization then follows the portion of the hysteresis loop from "*c*" to "*d*." During the read-out step as illustrated in FIG. 3*e*, the ferroelectric layer 12 undergoes a switching due to the increased positive voltage $V_1$ and polarization of the switched domains returns along the hysteresis loop from "*d*" to "*a*." Those portions of the ferroelectric layer 12 between the "bits" traverse the small loop in the upper portion of the hysteresis loop defined by the solid line *a–b* and the dotted line *d'* during the above cycle. It will be seen that those domains between the bits remain essentially in one state of polarization.

While the normalizing step of FIG. 3*a* shows the entire layer being flooded with light rays 16, it is understood that a single beam of light may be used to normalize by scanning in the same manner used for read-out.

An equation relating to the voltage across the ferroelectric layer in terms of the voltage applied across the photoconductive and ferroelectric combination is $$V_f = \frac{V_a}{K_f L_p / K_p L_f + 1}$$

where, $V_f$ is the voltage across the ferroelectric layer in darkness
$V_a$ is the voltage applied across the storage element
$K_f$ is the dielectric constant of the ferroelectric layer
$K_p$ is the dielectric constant of the photoconductive layer
$L_f$ is the thickness of the ferroelectric layer
$L_p$ is the thickness of the photoconductive layer.

In connection with the following examples, a thickness of 20 microns for each layer is assumed for illustrating particular storage elements useful in connection with the practice of the present invention. In addition, a coercive field of 2000 volts per centimeter is taken as a representative value since the coercive fields of the materials illustrated are somewhere in the range of 1000 to 5000 volts per centimeter, the coercive field strength being influenced by factors such as purity and crystalline state of the ferroelectric materials. In general, the voltage required across the ferroelectric layer to reduce the coercive field to zero where the coercive field is approximately 2000 volts per centimeter is in the neighborhood of 400 volts and the switching voltage, i.e., the voltage for changing the polarity of a ferroelectric domain is in the neighborhood of 8 volts.

*Example No. 1*

Layer 13—Photoconductor-cadmium sulfide (CdS); $K_p=11.6$

Layer 12—Ferroelectric-barium Titanate ($BaTiO_3$); $K_f=5000$

Using Equation 1

$$V_f = V_a/432$$

The voltage applied to plate member 10 necessary to switch the entire layer 12 in the dark would be $$V_a(\text{max.}) = 8 \times 432 = 3456 \text{ volts}$$

For actually recording, in accordance with this invention, a much lower voltage can be used, such as $$V_a = 100 \text{ volts}$$

With $V_a = 100$ volts, the voltage $V_f$ across layer 12 in darkness would be approximately ¼ volt which is far below the switching voltage. When photoenergy such as visible light shines on plate member 10, nearly all of the 100 applied volts $V_a$ will be across ferroelectric layer 12 which is more than enough for switching it.

*Example No. 2*

Photoconductor-Amorphous selenium (Se); $K_p = 6$
Ferroelectric-Rochelle salt ($NaKC_4-H_4O_6.4H_2O$); $K_f = 444$
In this case, $V_a$ (max.) = 600 volts. With $V_a = 100$ volts, $V_f$ will be only 1.3 volts in the dark.

*Example No. 3*

Photoconductor-zinc sulfide ($ZnS$); $K_p = 8.3$
Ferroelectric-potassium niobate ($KNbO_3$); $K_f = 500$
In this case $V_a$ (max.) = 488 volts. With $V_a = 60$ volts, $V_f$ in the dark will be approximately 1 volt.

*Example No. 4*

Photoconductor-anthracene ($C_6H_4:CH_2:C_6H_4$); $K_p = 3$
Ferroelectric-potassium dihydrogen phosphate ($KH_2PO_4$); $K_f = 42$
In this case $V_a$ (max.) = 120 volts. With $V_a = 30$ volts across the cell, $V_f$ will be about 2 volts in the dark.

As previously stated, the method described above is particularly well suited for recording and reading out data in a serial manner. The subject invention affords a basis for recording and retrieving data in a parallel mode, i.e., plural bits are placed in storage simultaneously and read out simultaneously. A parallel method, of course, would contemplate using plural light sources which are operable selectively for producing plural pulses simultaneously. A storage element adapted for parallel recording and retrieval is shown in FIG. 5.

The parallel recording storage element of FIG. 5 takes the form of a plate member 20 having a conductive substrate 21 on which is superimposed a layer 22 of ferroelectric material. Superimposed on the ferroelectric layer 22 is a layer 23 of photoconductive insulator material. Superimposed on the photoconductive layer 23 is a cover layer comprising a plurality of interspersed conductor electrode strips 24 and insulator strips 25. As in the case of the electrode layer 14 of storage element of FIG. 1, the electrode strips 24 are transparent conductors. Each strip 24 by being electrically isolated from the other strips 24 provides an individual record channel. In the embodiment of FIG. 5, plate member 20 has six tracks which would accommodate a six-bit binary code for example. Any number of strips 24 could be applied, however, to accommodate parallel recording in accordance with other codes.

The method for recording on the plate member 20 would follow generally the steps described in connection with the plate member 10. For parallel recording, however, all the bits of one character would be recorded simultaneously. For this purpose, plural light sources, e.g., one for each track, would move as a group relative to plate member 20. Each of the light sources would be independently operated to generate code-pulse combinations. During the recording portion of the cycle of operations, of course, plate member 20 would be maintained in darkness and a single potential would be applied across the sandwich by connection to substrate 21 and leads 26 of the strips 24. Also the recording step, of course, would be preceded by a normalizing operation if necessary by applying a unidirectional potential of a polarity opposite the recording potential to substrate 21 and leads 26 while the plate member 20 is flooded with light. For information retrieval, the plate member is scanned by a single beam covering all tracks while the "normalizing" potential is applied to the sandwich. As the scanning beam traverses the strips 24 and the photoconductive layer 23 underneath, the domains of layer 22 containing data bits are switched thereby sending current pulses through leads 26 to switchable pulse sensing and decode devices 27. Any well known decode device which converts plural bit code to a signal output of any type for operating an output decoder can be utilized.

An apparatus suitable for photorecording and retrieving of information in accordance with this invention is shown in FIG. 1. A storage element taking the form of a plate member 10 of the type shown in FIG. 2 is stationarily mounted by suitable means in a horizontal manner such that the transparent electrode layer 14 faces upward. Mounted above the layer 14 of plate member 10 is a photo projector device comprising a mirror 41, lens 42, and light source 43 mounted in fixed optical arrangement on a frame member 40. A belt member 44 connected to frame member 40 is wound around a pair of spaced apart pulleys 45 and 46. Pully 46 is connected to a reversible motor drive 28 or the like which is connected to record control device 29.

The potential for recording and retrieval is provided by a D.C. voltage source 47 having outputs connected by leads 48 and 49 to center terminals 50 and 51, respectively, of a two-way bi-pole reversing switch 52. Terminals 53 and 54 on one side of switch 52 are connected by leads 55 and 56 respectively, to ground and to lead 15 of electrode 14 of plate member 10. The terminals 57 and 58 on the second side of switch 52 are connected by leads 59 and 60 to ground and lead 15 of electrode 14 of plate member 10. The electrode 11 of plate member 10 is connected by lead 16 through resistor 61 to ground. Polarity of the voltage applied to electrodes 11 and 14 of plate member 10 is changed in conventional manner through blades 62 and 63 of switch 52 contacting terminals 53 and 54 or 57 and 58 on either side of the switch. While other arrangements are possible, for purpose of illustration a positive potential is applied to electrode 14 when switch blades 62 and 63 close on terminals 53 and 54. The potential on electrode 14 is negative relative to ground when the switch blades 62 and 63 are closed on terminals 57 and 58.

For detecting current pulses obtained on read-out (and/or read-in if checking is to be performed), a sense amplifier 64 is connected by leads 65 and 66 across resistor 61 in the circuit to electrode 11. An output from amplifier 64 may be used to operate a flash bulb projector 68 which emits light pulses in timed relation with pulses in resistor 61 through a lens 69 onto a film strip 70 movably mounted on film reels 71 and 72. As previously explained, the switching of domains in layer 12 generates pulses in the circuit of electrode 11. This, of course, occurs on read-in as well as read-out. Consequently, unless it is desirable to do otherwise, the sense amplifier should be disconnected during record. For that purpose a switch 73 of suitable type is provided in series with one side of amplifier in the circuit of lead 66. Since the switch is to be opened when read-in is performed and closed when retrieval is performed, the operation of switch 73 may be coordinated with the operation of a means (not shown) for feeding film 70.

In the embodiment of FIG. 1, the light source 43 of the input projector is designed to perform the normalizing, read-in, and read-out operations. For that purpose, light source 43 is connected by lead 80 to the common terminal 82 of a two-way single pole switch 81 having a blade 83 and output terminals 84 and 85. The circuit to light source 43 is completed by lead 86 connected to ground. Voltage for energizing the light source 43 in a constant manner is supplied by a D.C. source 87 having one terminal connected by lead 88 to one output terminal 84 of switch 81 and a second terminal connected by lead 89 to ground. A data signal source 90 is connected by leads 91 and 92 to amplifier 93 having a first output 94 connected to the second output terminal 85 of switch 81. A second output 95 from amplifier 93 is connected to ground. In its operation, data signal source 90 generates electric pulses in accordance with a predetermined pulse code. The pulses thus generated through amplifier 93 are applied to light source 43 when blade 83 of switch 81 is closed on terminal 85 to thereby cause light source 43 to generate a pattern of light pulses projectable through lens 42 to mirror 41 and onto layer 13 of plate member 10. The generation of electric and photo pulses is, of course, in accordance with the previous description, generated on a time and/or number basis. Thus, relative motion between the input photo projector and plate member 10 is required. For that purpose the initiation of the recording operation may be under record control device 29 which starts the motor 28 operating, thereby rotating transport pulleys 45 and 46. The speed of travel of the projector, of course, will be synchronized with the generation of electric and photo pulses. Means, automatic or manual, may also be provided for operating the switches 52 and 81 to initiate voltage switching, light source energization, projector apparatus transportation, and film feeding in the sequence to obtain normalizing and flooding with light illuminating the entire surface, photo pulse generation, and signal sensing and beam scanning in that order.

The operation of the recording apparatus shown in FIG. 1 is briefly as follows:

At the beginning of the recording cycle, switch 52 is closed so that a positive voltage from D.C. source 47 is applied through lead 48 switch blade 62, leads 56 and 15 to electrode 14 of plate member 10. At the same time, lead 49 connects the negative terminal of D.C. source 47 to ground through switch blade 63, terminal 53, and lead 55. The electrode 11 of plate member 10 is connected through resistor 61 and lead 16 to ground. The switch 73 in the circuit of sense amplifier 64 is open. Film 70 of output record device is stationary. With the input optical projector device positioned at the extreme right end of the plate member 10, switch plate 83 of switch 81 is operated to close a circuit from voltage source 87 through leads 88, 80, and 86 to energize light source 43. The transport pulley 46 rotating clockwise moves the photo projector relative to the plate member 10 so that a constant light beam from source 48 scans the recording surface of plate member 10. At the end of the scan operation, motor 28 reverses direction of pulley 46 returning the optical projector to the right end of plate member 10. Motor 28 stops and pulley 46 discontinues rotation and switch 81 is open to deenergize light source 43. Switch 52 is now reversed so that a negative polarity is applied to electrode 14 of plate member 10. Switch 81 is then operated to close the circuit from input amplifier 93 to light source 43. The generation of input data pulses from signal source 90 begins simultaneously with the operation of motor 28 which again rotates pulley 46 in a clockwise direction. Once again the transport mechanism moves the input photo projector across the surface of plate member 10. As the projector is moving, preferably at a constant rate of speed, the light source 43 is being pushed from signals from data signal source 90 thereby generating a pattern of light beam pulses onto layers 14 and 13 of plate member. Those areas of plate member 10 which are exposed to light pulses from light source 43 have domains in layer 12 switched to a reverse polarity as previously described. At the end of the scan of the input photo projector switch 81 is opened so that light source 43 ceases to generate data pulses, and motor 28 is stopped then operated to rotate pulley 46 counterclockwise. Motor 28 drives pulley 46 until the photo projection device is returned to the right end of plate member 10.

For read-out operation, switch 52 is again operated to apply a positive potential to electrode 14. Switch 73 is closed to connect the sense amplifier 64 across resistor 61. Motor 28 is again set in operation to move the input photo projector device by the clockwise movement of pulley 46. At the same time, switch 81 is operated to apply a constant voltage from voltage source 87 to light source 43. As pulley 46 rotates the projector device scans the surface of plate member 10 with a constant beam of light from source 43. As the surface of plate member 10 is being scanned, the previously switched domains of layer 12 are again switched to normal polarity as previously described. As each domain is switched a current pulse is generated in resistor 61. Sense amplifier 64 in response to pulses in resistor 61 applies an energizing pulse to light source 68 which is projected by lens 69 onto film 70. During the time that the input photo projector is moving the scanning beam across the plate member 10, film 70 is being fed in synchronism therewith past the projection station of the beam from light source 68. Thus a time record of bits may be optically produced on film 70 for later read-out and utilization. Other ways for obtaining read-out pulses from amplifier 64 to decode and translate the recorded information into usable data will readily occur to persons skilled in the art.

At the end of the scanning operation, switch 81 is operated to disconnect light source 43 from the voltage source 87. Simultaneously and if desired by automatic control means, switch 73 may be opened so as to disconnect sense amplifier 64 from the circuit connecting it across resistor 61. The feeding of film 70 is discontinued and switch 52 may be opened. Motor 28 drives pulley 46 in counterclockwise direction to return the photo projector device to the right end of plate member 10.

While FIG. 1 discloses an apparatus where a memory unit is stationary and the optical projector is moving, the invention may be practiced where the relative motion is obtained in a reverse manner. In addition, recording and read-out may be obtained by having a stationary photo projector and having a storage element in the form of a rotatable drum as previously described. In such an embodiment, the rotation of the storage drum may be continuous and the operation of the various switches to obtain energization of light source 43, the application of potential to the storage element, and the operation of the read-out amplifier and projector means are synchronized with the rotation of the storage drum.

For parallel recording on the storage element plate member 20 of FIG. 5, an arrangement is provided similar to that shown in FIG. 1; however, the input photo projector device would consist of plural light sources 43 and projector means, i.e., lens 42 and mirror 41 arranged and adapted to project light beams constant and pulsating onto the individual conductor strips 24. Connection of the voltage source 47 for biasing the plate member 20 would utilize switching elements similar to those in FIG. 1; however, the read-out circuit would involve suitable connection of a multi-channel pulse sensing and decode device 27 to the individual input leads 26 of the conductor strips 25 of plate member 20. The output circuit for such an arrangement would involve plural channels and amplifiers having outputs connected to energize plural light sources 68 each adapted to project separate light pulses to parallel "tracks" on a record film 70.

As shown in FIG. 6, the plural light sources 43 are carried preferably in individual chambers by the frame member 40 which is attached to belt member 44, wound on pulleys 45 (not shown) and 46. A light beam from each of the light sources 43 is projected onto the plate member 20 in the individual tracks defined by the conductive strips 24. The operation of the plural light sources would be under control of a parallel bit data signal source.

FIG. 7 shows a storage element in which parallel recording can be obtained and which has a continuous transparent electrode. As shown in FIG. 7 the storage element takes the form of a plate member 30 comprising a conductive substrate 31 on which is superimposed a ferroelectric layer 32. Like the storage element in FIG. 2, the ferroelectric layer 32 is covered with a photoconductive layer 33 which has a continuous transparent conductive layer 34 superimposed on it. Layer 33 of plate 30, however, is one which is electroluminescent as well as photoconductive. A suitable material which has these characteristics in combination would be a zinc sulfide phosphor with a copper activator and a chlorine coactivator, i.e., ZnS:Cu:Cl, with the quantity of Cu and Cl in the following ranges: Cu 0.1-0.6 mole percent, Cl 0.05-0.3 mole percent. A second material which has these characteristics in combination would be ZnS-ZnSe: Cu:Br, with 90 percent ZnS and 10 percent ZnSe and the activators are in the following ranges: Cu 0.1-0.6 mole percent, Br 0.05-0.3 mole percent.

The method for recording on the plate member 30 of FIG. 7 is substantially the same as the method for the plate member 10; however, in place of a light source which generates photoenergy in the visible range, the light source for plate member 30 would generate photoenergy in the ultraviolet portion of the spectrum. Recording is accomplished by projecting a spot or slit of ultraviolet light onto the upper surface of the memory unit. As the slit moves or sweeps over the plate member 30, the phosphor layer, excited to a conductive state by the ultraviolet light, experiences an increase in electric field in the area exposed to the ultraviolet light. This results in a flash of light of increased intensity which can be utilized to detect the presence of switched domains in the ferroelectric layer 32.

A mechanism for utilizing the storage element in FIG. 7 is illustrated in FIG. 8. As there shown, the storage element takes the form of a drum 35 having a conductive cylindrical substrate 36 having a conductive rotatable shaft 37. A ferroelectric layer 32 is superimposed over the entire peripheral surface of substrate 36. A photoconductive electroluminescent layer 33 superimposed on layer 32 has a continuous transparent conductive layer 34 on the outer periphery thereof. A voltage source 38 is connected through a suitable switching means 39 and leads 39*a* and *b* to apply potentials in accordance with the method previously described.

While the memory drum of FIG. 8 is particularly well suited for parallel recording, the description of the optical mechanism will be limited to single track recording, it being understood that the same types of optical systems would be used for each additional track in parallel recording techniques. Ultraviolet energy from light source 100 reflected by mirror 101 passes through slit forming member 102, lens 103 and is reflected from a mirror 104 onto a surface of drum 35. As the drum member 35 rotates past the axis of projection of the ultraviolet beam, domains in layer 32 which have been previously switched on a read-in operation will be reswitched causing layer 33 to luminesce in those regions where a bit has been stored. The light energy produced by luminescence is projected through mirror 104 to focusing lens 105 and onto a photosensitive light detector 106 such as a photocell. Signals generated by photocell are sensed and decoded by means 107 to identify and/or transcribe the information stored on drum 38.

In the read-in portion of the cycle, the technique follows the steps of the previously described methods. Ultraviolet source 100 generates a continuous beam which sweeps its track as drum 35 rotates with the bit domains being switched to generate light pulses detectable by sensing element 106. It is understood that drum 30 is maintained within a light type enclosure (not shown) during the entire recording cycle. Multi-track recording is obtained by plural input light sources 100 mounted with plural projector means to project plural beams onto surface of drum 35 in plural tracks. Multiple mirrors 104 and photocells 106 sense luminescent bits from parallel tracks on read-out. In such arrangement, output means 107 is a multi-channel device adapted to sense and decode plural signals in parallel from photocells 106. Thus plural strip electrode arrangement of FIG. 5 is avoided.

While the invention has been particularly shown and described with reference to preferred embodiments thereof, it will be understood by those skilled in the art from the foregoing that other changes in form and details may be made therein without departing from the spirit and scope of the invention.

What is claimed is:

1. A photoelectric data recording apparatus comprising a memory element having superposed layers of photoconductive and ferroelectric material, means for applying unidirectional potentials of first and second polarities across said layers, said potentials being of a magnitude incapable of switching domains of said ferromagnetic layer in darkness but capable of switching the polarity of domains of said ferroelectric layer coincidentally with the radiation of said photoconductive layer, means for energizing said photoconductive layer with radiant energy capable of switching said photoconductive layer from a non-conducting to a conducting state, and means operable for coordinating said potential applying means and said radiant energy means for producing the switching of domains in said ferroelectric layer in accordance with a predetermined data pattern including means for effecting a relative movement of said memory element and said radiant energy means, and means for selectively operating said radiant energy means in timed relation with said relative movement.

2. A photoelectric data recording apparatus in accordance with claim 1 in which said energizing means includes means for producing a radiant energy beam projectable onto the photoconductive layer of said memory element, and said means for effecting relative movement includes means for directing said beam projecting means along said photoconductive layer in a single recording track region, and said means for selectively operating said radiant energy means includes means for producing a series of beam pulses in timed relation with said relative movement in accordance with a series multiple bit data pattern.

3. A photoelectric data recording apparatus comprising a memory element having superposed layers of photoconductive and ferroelectric material, means for applying unidirectional potentials of first and second polarities across said layers, said potentials being of a magnitude incapable of switching domains of said ferromagnetic layer in darkness but capable of switching the polarity of domains of said ferroelectric layer coincidentally with the radiation of said photoconductive layer, means for energizing said photoconductive layer with radiant energy capable of switching said photoconductive layer from a non-conducting to a conducting state, and means operable for coordinating said potential applying means and said radiant energy means for producing a read-in switching of domains in said ferroelectric layer in accordance with a predetermined data pattern including means for applying a constant potential of said first polarity to said memory element, means for effecting a relative movement of said memory element and said radiant energy means, and means for selectively operating said radiant energy means coincidentally with the application of said constant potential and in timed relation with said relative movement.

4. A photoelectric data recording apparatus in accordance with claim 3 which further comprises storage readout means including means for applying a constant potential of said second polarity across said memory element, means for scanning said photoconductive layer of said memory element with a constant beam from said energizing means coincidentally with the application of said potential of said second polarity, means for sensing electric pulses generated by domains switched in said ferroelectric layer, and output means responsive to said sensing means for recording said domain pulses in another form.

5. A photoelectric data recording apparatus comprising a memory element having superposed layers of photoconductive and ferroelectric material, means for applying unidirectional potentials of first and second polarities across said layers comprising electrode means in contact with the exposed surface of said superposed layers, said potentials being of a magnitude incapable of switching domains of said ferroelectric material in darkness but capable of switching the polarity of the domains of said ferroelectric layer coincidentally with the radiation of said photoconductive layer, said electrode means in contact with said photoconductive layer being transparent and adapted to form plural recording tracks in said memory element, said means for applying said potentials further including a reversible polarity switching means connectable to said electrode means, means for energizing said photoconductive layer with radiant energy capable of switching said photoconductive layer from a non-conducting to a conducting state, said energizing means including means for generating plural beams of radiant energy onto said photoconductive layer in the regions of said plural recording tracks provided by said transparent conductive electrode means, and means operable for coordinating the application of said potentials and said radiant energy means including means for selectively pulsing said beam generating means in accordance with a predetermined pattern whereby parallel domains are switchable in plural record tracks in said ferroelectric layer of said memory element.

6. A photoelectric data apparatus in accordance with claim 5 in which said electroluminescent layer is formed of an electroluminescent phosphor and said radiant energy means generates ultraviolet radiation.

7. A photoelectric data apparatus in accordance with claim 5 in which said energizing means includes means for producing plural beams of said radiant energy for projection onto one or more track regions of said memory element, and said coordinating means includes means for selectively operating said beam producing means in accordance with a predetermined multiple bit data pattern.

8. A photoelectric data apparatus in accordance with claim 5 further comprising read-out means including means operable for sensing luminescent pulses producible in said electroluminescent layer in response to switching of domains in said ferroelectric layer.

9. A photoelectric data recording apparatus comprising a memory element having a first layer of photoconductive and electroluminescent material superimposed on a second layer of ferroelectric material, means for applying unidirectional potentials of first and second polarities across said layers, said potentials being of a magnitude incapable of switching domains of said ferroelectric material in darkness but capable of switching the polarity of domains of said ferroelectric layer coincidentally with the radiation of said photoconductive and electro-luminescent layer, means for energizing said first layer with radiant energy capable of switching the resistance thereof to produce a luminescence therein in response to the switching of domains in said second layer, and means operable for coordinating the application of said potentials and said radiant energy means for producing the switching of domains in said second layer in accordance with a predetermined pattern indicative of data to be recorded.

References Cited in the file of this patent

UNITED STATES PATENTS

| | | |
|---|---|---|
| 2,743,430 | Schultz et al. | Apr. 24, 1956 |
| 2,969,481 | Sack | Jan. 24, 1961 |
| 3,021,510 | Anderson | Feb. 13, 1962 |
| 3,050,654 | Toulon | Aug. 21, 1962 |